March 27, 1951  C. CUPPS  2,546,920
ELECTROPLATING AND ELECTROPOLISHING APPARATUS
Filed June 23, 1948
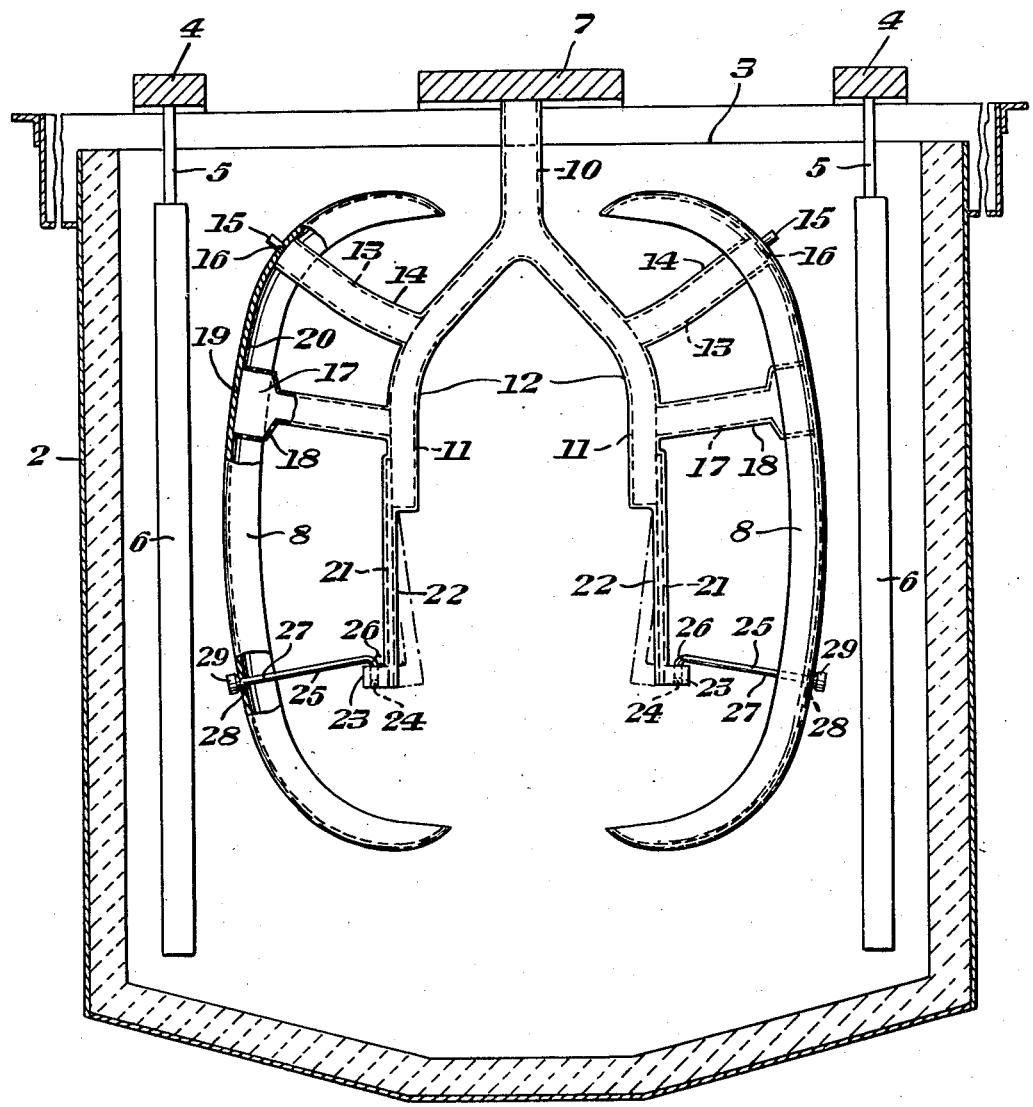
INVENTOR
Clyde Cupps Patented Mar. 27, 1951

2,546,920

UNITED STATES PATENT OFFICE 2,546,920

ELECTROPLATING AND ELECTROPOLISHING APPARATUS

Clyde Cupps, Newton Falls, Ohio, assignor to Standard Steel Spring Company, Coraopolis, Pa., a corporation of Pennsylvania Application June 23, 1948, Serial No. 34,773

1 Claim. (Cl. 204—297)

This invention relates to apparatus for electroplating or electropolishing metal articles. It relates more particularly to a support or rack used in electroplating or electropolishing.

In electroplating articles such for example as automobile bumpers, it is necessary to have good electrical contact with the bumper if the electroplating is being carried out at high current density. Likewise, where a plated bumper, for instance a nickel plated bumper, is being electropolished by employing the bumper as an anode in a bath, it is necessary to have good electrical contact if high current densities are employed.

In the accompanying drawing, which illustrates a preferred embodiment of my invention, the figure is a vertical section taken through a plating tank showing the manner in which two automobile bumpers may be supported.

Referring more particularly to the accompanying drawing, the reference numeral 2 designates an electroplating tank of usual construction, the liquid level being indicated by the line designated 3. Two bus bars 4 extend longitudinally along the top of the tank, each bus bar being connected by a lead 5 to an electrode 6. Another bus bar 7 also extends longitudinally along the top of the tank. In electroplating the automobile bumpers 8, the bumpers are connected in the electric circuit as cathodes, whereas in electropolishing, the bumpers are connected in the circuit as anodes. In either case it is desirable that the electrical contacts tightly engage the bumpers in order that high current densities may be employed.

A vertically extending support or rack 10 having two downwardly extending branches 11 is connected at its upper end to the bus bar 7. The support is made of good electrical conducting material, such as copper, and is covered with rubber or other electrical insulating material 12 on all portions except where it is connected to the bus bar.

A supporting arm 13 covered with electrical insulation 14 is connected at its inner end to each of the branches 11 of the support 10. At its outer end each of the supporting arms 13 has a locating pin 15 which is adapted to be received in a hole 16 formed in the bumper. An electrical contact 17 made of copper or other good electrical conducting material and having an insulating covering 18, is located below each of the arms 13. Each contact 17 is connected at its inner end to one of the branches 11 and at its outer end 19 presses against the inner surface 20 of the bumper. A spring 21 covered with insulation 22 is connected to each of the branches 11 and extends downwardly therefrom. The spring may conveniently be made of spring steel covered with rubber. A lug or projection 23 having an opening 24 is secured to the lower end of the spring. A hook 25 has a curved portion 26 received in the opening 24, a body portion 27 which passes through an opening 28 in the bumper, and an enlarged head 29 for retaining the hook in place on the bumper.

In using the apparatus, a hook 25 is passed through the opening 28 in a bumper and two bumpers with their hooks are placed on the support 10, each bumper being supported by an arm 13 and located in proper position by means of the locating pin 15 which extends through an opening 16 in the bumper. After the bumpers have been placed on the support, the curved end 26 of the hook is placed in the opening 24 formed in the lug 23, thereby causing the springs 21 to bring the bumpers into tight engagement with the electrical contacts 17. The support 10 carrying the bumper bars is then lowered into the bath and electric current is applied either for electroplating or for electropolishing.

The provision of the springs 21, together with the hooks 25 or equivalent connecting means, insures that the bumper bars will be drawn into tight engagement with the electrical contact 17, thereby enabling high current densities to be employed.

The invention is not limited to the preferred embodiment but may be otherwise embodied or practiced within the scope of the following claim.

I claim:

In electroplating and electropolishing apparatus, a substantially vertically extending support for an article, said support being connected in an electric circuit, a supporting arm connected at its inner end to said support and having at its outer end a locating pin adapted to be received in a hole formed in the article, an electrical contact connected to said support below said supporting arm and contacting the article over an area at least several times greater than the area of contact between the article and said locating pin, a spring connected to said support and extending below said electrical contact, and a hook connecting said spring and article for holding the article tightly against said electrical contact, said hook having a body portion passing through an opening in the article, an enlarged head for retaining the hook in place, and a curved portion for removable engagement with said spring.

CLYDE CUPPS.

REFERENCES CITED

The following references are of record in the file of this patent:

UNITED STATES PATENTS

| Number | Name | Date |
|---|---|---|
| 1,308,508 | Roedel | July 1, 1919 |

OTHER REFERENCES

Ser. No. 290,026, Weiner (A. P. C.), published July 13, 1943.

"Belke Plating Rack Manual," Belke Mfg. Co., Chicago 51, Illinois, June 18, 1947, pp. 49 and 99.